No. 850,696. PATENTED APR. 16, 1907.
M. Z. VIAU.
PIPE WRENCH.
APPLICATION FILED FEB. 9, 1907.
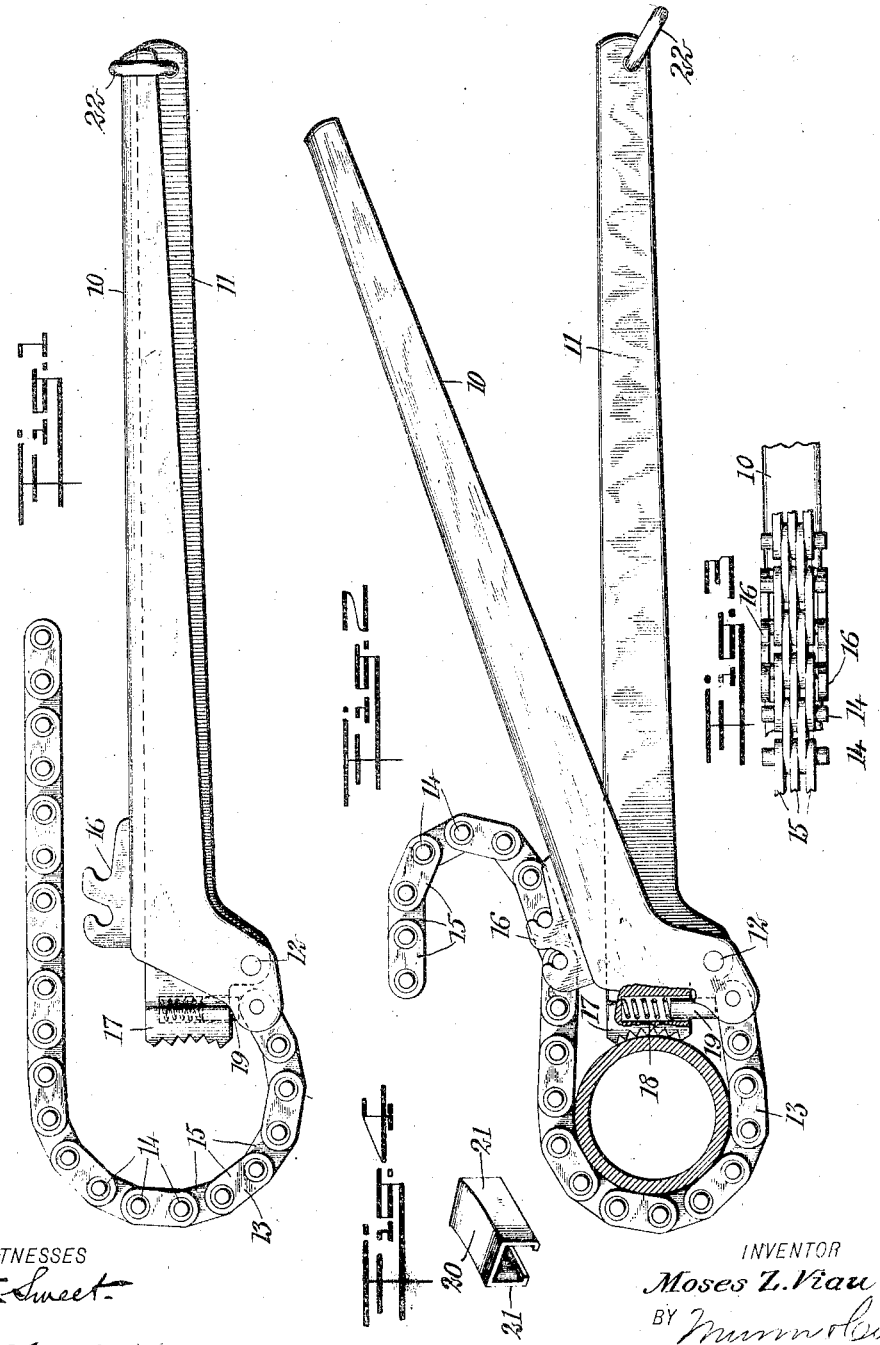
WITNESSES
F. D. Sweet
E. W. Fairbank
INVENTOR
Moses Z. Viau
BY Munn & Co
ATTORNEYS

UNITED STATES PATENT OFFICE.

MOSES Z. VIAU, OF PLATTSBURG, NEW YORK.

PIPE-WRENCH.

No. 850,696.  Specification of Letters Patent.  Patented April 16, 1907.

Application filed February 9, 1907. Serial No. 356,537.

*To all whom it may concern:*

Be it known that I, MOSES Z. VIAU, a citizen of the United States, and a resident of Plattsburg, in the county of Clinton and State of New York, have invented a new and Improved Pipe-Wrench, of which the following is a full, clear, and exact description.

This invention relates to improvements in pipe-wrenches, and more particularly to that type of pipe-wrench in which a chain is employed for surrounding and gripping the pipe, bar, or other object to be held by the wrench.

The object of my invention is to so construct the operating parts that the wrench may be employed to hold a pipe of any diameter without necessitating any special adjustment of the chain other than to hook it to one of the movable members at the desired point intermediate its ends.

Reference is to be had to the accompanying drawings, forming a part of this specification, in which similar characters of reference indicate corresponding parts in all the figures.

Figure 1 is a side elevation of my improved wrench, showing the chain in its open position. Fig. 2 is a view similar to Fig. 1, but showing the parts in their operative position.
Fig. 3 is a detailed plan view of the chain and hooks or catches to which the latter is attached, and Fig. 4 is a perspective view of an auxiliary jaw having a smooth face and adapted to be used for polished pipes.

In the specific employment of my invention which I have illustrated in the drawings I employ two members 10 and 11, pivoted together by a suitable rivet 12 and each of said members being provided with extensions forming the handles, whereby the device may be operated. Preferably one of the members 10 is formed channel-shaped in cross-section and the other member 11 is formed of a bar of steel of such a thickness as to permit it to fit within the channel of the member 10.

Adjacent the rivet 12, by which the two members are held together, I attach a chain 13, so secured that it cannot be readily detached. This chain preferably comprises a plurality of rivets or pivot-pins 14, connected together by a plurality of links 15 intermediate the ends of the pivots and spaced therefrom, whereby the ends of the pivots extend out beyond the links and afford means whereby the free end of the chain may be detachably secured to the member 10.

The member 10, to which the chain is rigidly secured adjacent the pivot-point 12, is also provided with a plurality of hook members or catches 16 on the opposite sides thereof and spaced apart a sufficient distance to permit the link of the chain to lie therebetween. Each hook or catch member is adapted to engage with the ends of one or more of the pivots 14 of the chain and firmly hold the chain against longitudinal movement in respect to the member 10. The other of the two pivoted members—namely, the bar 11—extends through an opening in the end of the member 10 intermediate the point at which the chain is permanently secured to the member 10 and the point at which the free end of the chain is detachably secured thereto.

The inner end 17 of the member 11 is provided with teeth adapted to engage with the pipe which it is desired to hold, and as the member 11 is pivoted at a point adjacent its outer side the movement of the two handles toward each other will tend to cause the inner end 17 to move in respect to the points of attachment of the chain and to enter to a greater degree the loop formed by the chain, as will be clearly indicated in the drawings.

In the employment of my improved device the handles are separated so as to withdraw the inner end more nearly into alinement with the point of attachment of the chain and the catch or hook member 16, and the chain is then wrapped about the pipe and the free end caught in the hook member 16. Upon pressing the handles together the end 17 enters the loop and comes into firm engagement with one side of the pipe, and the latter may thus be firmly held, and by reason of the teeth on the said end the pipe may be rotated in either direction. Preferably the inward movement of the inner end 17 is greater than the distance between the two adjacent pivots 14 of the chain, whereby the necessity for adjusting the connections between the chain and one of the members at more than one point is obviated and the wrench adapted to grip a pipe of any diameter.

Any suitable means may be employed for normally separating the handle members to withdraw the inner end 17 and release the grip of the wrench, said means preferably comprising a spring in engagement with both of said members. In the specific form of this means illustrated in the drawings there is provided a small coil-spring 18, fitting within a recess in the end 17 and normally pressing a plunger 19 into engagement with the pivot of the first link of the chain. The expansion of the spring tends to separate the two members and render the wrench ready for use at all times.

When it is desired to employ the wrench in connection with nickel-plated or other polished pipes, I provide an auxiliary jaw (shown in Fig. 4) and having a smooth surface 20 and side members 21, adapted to engage with the sides of the inner end 17 and be held by frictional contact. For locking the two handle members in contact with each other, as indicated in Fig. 1, I preferably provide a locking-ring 22 of any suitable character.

Having thus described my invention, I claim as new and desire to secure by Letters Patent—

1. A pipe-wrench comprising a handle member, a chain having one end permanently secured thereto, means for detachably securing the other end of the chain thereto, and a second handle member pivoted to the first-mentioned member and having one end adapted to enter the loop formed by the chain at a point intermediate the points of attachment of the chain.

2. A pipe-wrench comprising a handle member, a chain permanently secured adjacent one end thereof, a catch or hook carried by said member and adapted to receive the free end of the chain, and a second handle member pivotally connected to the first-mentioned member at a point intermediate the points of attachment of the chain, and having an end adapted to enter the loop formed by the chain when the handle members are brought together.

3. A pipe-wrench comprising a handle member, a chain permanently secured adjacent one end thereof, a catch or hook carried by said member and adapted to receive the free end of the chain, and a second handle member pivotally connected to the first-mentioned member at a point intermediate the points of attachment of the chain, and having an end provided with gripping-teeth and adapted to enter the loop formed by the chain when the handle members are brought together.

4. A pipe-wrench comprising a handle member, a chain permanently secured to one end thereof and having outwardly-extending pivot-pins, a hook or catch carried by said member and adapted to engage with the pivot-pins of the free end of the chain, a second handle member pivotally connected to the first-mentioned member intermediate the points of attachment of the chain and having an end provided with gripping-teeth adapted to enter the loop formed by the chain and engage with the pipe when the handle members are brought together, and means normally tending to separate said handle members.

5. A pipe-wrench comprising two handle members, one of said members being channel-shaped in cross-section and the other of said members adapted to fit within the channel of the first-mentioned member, a chain, means for permanently attaching one end of said chain to the first-mentioned member, means for detachably securing the other end of said chain to the same member, and means for pivotally connecting said members whereby the end of one member may enter the loop formed by the chain attached to the other member when said members are brought together.

6. A pipe-wrench having a handle member, a chain secured adjacent one end thereof, a catch or hook carried by said member and adapted to receive the free end of the chain, a second handle member pivotally connected to the first-mentioned member at a point intermediate the points of attachment of the chain and having an end provided with gripping-teeth adapted to enter the loop formed by the chain when the handle members are brought together, and a detachable jaw having a smooth face and adapted to be secured to said last-mentioned member to cover the gripping-teeth thereof.

In testimony whereof I have signed my name to this specification in the presence of two subscribing witnesses.

MOSES Z. VIAU.

Witnesses:
 GEO. L. AUBREY,
 FRED O. LEWIS.